No. 782,360. PATENTED FEB. 14, 1905.
J. E. ROTH.
COMBINED HARROW AND SEED COVERER.
APPLICATION FILED MAY 21, 1904.
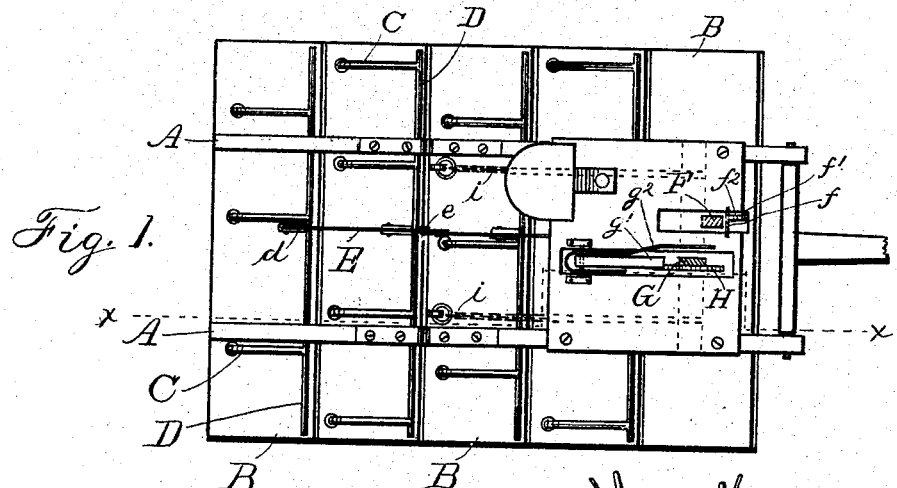
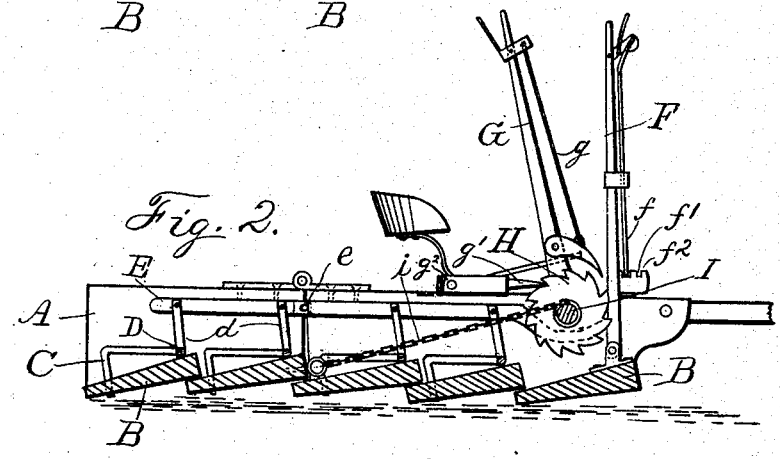
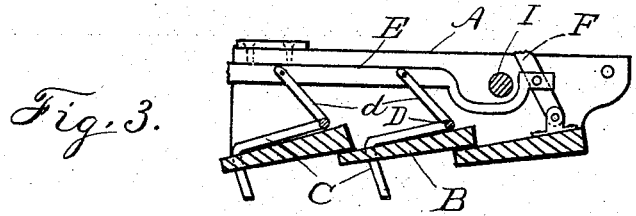

No. 782,360.　　　　　　　　　　　　　　　　　　　Patented February 14, 1905.

UNITED STATES PATENT OFFICE.

JOHN E. ROTH, OF UTICA, NEW YORK.

COMBINED HARROW AND SEED-COVERER.

SPECIFICATION forming part of Letters Patent No. 782,360, dated February 14, 1905.

Application filed May 21, 1904. Serial No. 209,002.

*To all whom it may concern:*

Be it known that I, JOHN E. ROTH, a citizen of the United States, residing at Utica, in the county of Oneida and State of New York, have invented new and useful Improvements in a Combined Harrow and Seed-Coverer, of which the following is a specification.

The special object of the invention is to combine in one agricultural implement a harrow and seed-coverer.

The invention will be first described in connection with the drawings and then pointed out in the claims.

Figure 1 of the drawings is a plan view; Fig. 2, a vertical section on line $x$ $x$ of Fig. 1, and Fig. 3 a fragmentary view with the teeth lowered.

In the drawings, the longitudinal bars A A and cross-bars B are shown to make up the frame of the implement. The bars B are stepped into subjacent notches of the bars A, so that they will rest at an acute angle to a horizontal plane. This allows the drag-bars B to ride on and over the clods, so as to crush and crumble them down.

C represents my angle-shaped harrow-teeth, which are rigidly attached to tooth-bars D, which have the arms $d$ pivoted to a longitudinal reach E. Cross-bars D rest upon the bars B, so that they may be conveniently operated by the arms $d$, which are moved by the reach. The latter is end-pivoted in front to a vertical hand-lever F, which is fulcrumed at its lower end to a front drag-bar B, and has a spring-detent $f$, which may work in notches $f'$ of the plates $f^2$, so as to hold the teeth in or out of the ground.

G is a vertical lever provided with a carrying-pawl $g$ and a detent $g'$, which work in a pinion H, fast on the windlass I. The latter winds up the chains I I, attached to the rear section of frame, by means of lever G with its carrying-pawl $g$, so as to hold the two sections in conjunction, while it is held in the position desired by the detent $g'$. The detent-pawl is spring-held in its holder $g^2$. The reach E being jointed at $e$, allows the rear section to be raised when the chains I are lowered in passing over ditches or dead furrows.

The drag-bars B may be made of metal or iron-bound plank of considerable thickness and of a size suitable to one, two, or four horses.

The harrow-teeth C help to break up the clods, while they stir and pulverize the soil so as to bring it into fine tilth for the reception of grain or grass-seed. After the seed has been sown and the teeth raised the drag-bars B cover it lightly but sufficiently with fine earth to insure the quickest and most perfect vegetation. It will thus be seen that after the ground has been carefully plowed my single implement will perform all after operations in pitching or putting in the crop.

What I claim as new, and desire to protect by Letters Patent, is—

1. The combination with the bars A B, reach E and adjusting mechanism F $f$ $f'$, of the angled teeth-bars C D passing through bars B and connected pivotally by an arm $d$ with the reach E as and for the purpose described.

2. The pawl and detent-lever G $g$ $g'$, pinion H and windlass I in combination with the frame A B made in two parts pivoted together substantially as and for the purpose set forth.

In testimony whereof I have signed my name to this specification in the presence of two subscribing witnesses.

JOHN E. ROTH.

Witnesses:
　GEO. H. CHANNER,
　DENNIS M. RIGGS.